United States Patent
Noetzel et al.

(10) Patent No.: US 7,294,421 B2
(45) Date of Patent: Nov. 13, 2007

(54) SOLID OXIDE AUXILIARY POWER UNIT REFORMATE CONTROL

(75) Inventors: John G. Noetzel, Fairport, NY (US); Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 413 days.

(21) Appl. No.: 09/778,537

(22) Filed: Feb. 7, 2001

(65) Prior Publication Data
US 2002/0106544 A1 Aug. 8, 2002

(51) Int. Cl.
H01M 8/04 (2006.01)
H01M 8/12 (2006.01)
(52) U.S. Cl. .................................. 429/22; 429/13
(58) Field of Classification Search .................. 429/13, 429/19, 20, 22, 25; 700/245
See application file for complete search history.

(56) References Cited

U.S. PATENT DOCUMENTS

| | | | |
|---|---|---|---|
| 5,059,494 A * | 10/1991 | Vartanian et al. ............. 429/17 |
| 5,366,821 A | 11/1994 | Merritt et al. |
| 5,397,656 A * | 3/1995 | Morimoto et al. ............. 429/17 |
| 5,441,821 A | 8/1995 | Merritt et al. |
| 5,616,430 A * | 4/1997 | Aoyama ...................... 429/17 |
| 5,678,647 A | 10/1997 | Wolfe et al. |
| 5,885,727 A * | 3/1999 | Kawatsu ....................... 429/17 |
| 5,925,476 A | 7/1999 | Kawatsu |
| 5,968,680 A | 10/1999 | Wolfe et al. |
| 5,976,725 A | 11/1999 | Gamo et al. |
| 6,266,576 B1 * | 7/2001 | Okada et al. ............ 318/568.12 |
| 6,306,531 B1 * | 10/2001 | Clingerman et al. .......... 429/19 |

FOREIGN PATENT DOCUMENTS

| | | |
|---|---|---|
| DE | 199 56 225 | 5/2000 |
| EP | 0 568 822 | 11/1993 |

OTHER PUBLICATIONS

Don Green, editor, Perry's Chemical Engineers' Handbook, Seventh Edition, McGraw-Hill Publishers, pp. 8-4 to 8-5, 1997.*
Perry's Chemical Engineers' Handbook, seventh edition, 1997, pp. 8-69.*

* cited by examiner

Primary Examiner—Patrick Joseph Ryan
Assistant Examiner—Ben Lewis
(74) Attorney, Agent, or Firm—Paul L. Marshall (57) ABSTRACT

A method and system for controlling reformate delivered to an electrochemical cell in an electric power system. The system comprises: a reformate pressure sensor disposed in the reformate and configured to measure reformate pressure; a controllable valve configured to control the flow of reformate to the electrochemical cell; and a controller coupled to the reformate pressure sensor and the controllable valve. The controller receives a reformate pressure signal from the reformate pressure sensor, a controllable valve position signal from the controllable valve, and transmits a controllable valve command to the controllable valve.

40 Claims, 5 Drawing Sheets

SOLID OXIDE AUXILIARY POWER UNIT REFORMATE CONTROL

TECHNICAL FIELD

The present disclosure relates to mass flow control of a reformate for a solid oxide fuel cell.

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally fueled internal combustion engine a nearly zero emission system having the efficiency necessary to make the vehicle commercially viable.

Alternative fuels cover a wide spectrum of potential environmental benefits, ranging from incremental toxic and carbon dioxide ($CO_2$) emission improvements (reformulated gasoline, alcohols, LPG, etc.) to significant toxic and $CO_2$ emission improvements (natural gas, DME, etc.). Hydrogen is clearly the ultimate environmental fuel, with potential as a nearly emission free internal combustion engine fuel (including $CO_2$ if it comes from a non-fossil source). Unfortunately, the market-based economics of alternative fuels, or new power train systems, are uncertain in the short to mid-term.

The automotive industry has made very significant progress in reducing automotive emissions in both the mandated test procedures and the "real world". This has resulted in some added cost and complexity of engine management systems, yet those costs are offset by other advantages of computer controls: increased power density, fuel efficiency, drivability, reliability, and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions, with failed, or degraded components.

One approach to addressing the issue of emissions is the employment of electrochemical cells or fuel cells, particularly solid oxide fuel cells ("SOFC"), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy.

A SOFC may be used in conjunction with a reformer that converts a fuel to hydrogen and carbon monoxide (the reformate) usable by the fuel cell. Three types of reformer technologies are typically employed (steam reformers, dry reformers, and partial oxidation reformers) to convert hydrocarbon fuel (methane, propane, natural gas, gasoline, etc.) to hydrogen using water, carbon dioxide, and oxygen, respectfully, with byproducts including carbon dioxide and carbon monoxide, accordingly. These reformers typically operate at high temperatures. At lower temperatures, e.g., during startup, deposition of carbon (or soot) upon the catalyst can adversely affect the reformer efficiency and reduce reformer life. Major requirements for the reformers are rapid start, dynamic response time, fuel conversion efficiency, size, and weight.

Various methods of introducing the reformate to the SOFC have been utilized. These methods typically include direct interfaces or restrictive orifice between the reformer and the SOFC. Typically, a restrictive orifice is employed. Such a configuration however, lacks the ability to adequately regulate the amount of reformate that is applied to the SOFC to control the SOFC output.

What is needed in the art then, is method and apparatus, which allows the regulation of the reformate delivered to a SOFC.

SUMMARY

A method and system for controlling reformate delivered to an electrochemical cell in an electric power system. The system comprises: a reformate pressure sensor disposed in the reformate and configured to measure reformate pressure; a controllable valve configured to control the flow of reformate to the electrochemical cell; and a controller coupled to the reformate pressure sensor and the controllable valve. The controller receives a reformate pressure signal from the reformate pressure sensor, a controllable valve position signal from the controllable valve, and transmits a controllable valve command to the controllable valve.

BRIEF DESCRIPTION OF THE DRAWINGS

Referring now to the accompanying drawings, which are meant to be exemplary not limiting, and wherein like elements are numbered alike in the several figures.

DESCRIPTION OF THE PREFERRED EMBODIMENT

Different types of SOFC systems exist, including tubular or planar systems. These various systems employ a variety of different cell configurations. Therefore, reference to a particular cell configuration and components for use within a particular cell configuration are intended to also represent similar components in other cell configurations where applicable.

Figure 1:
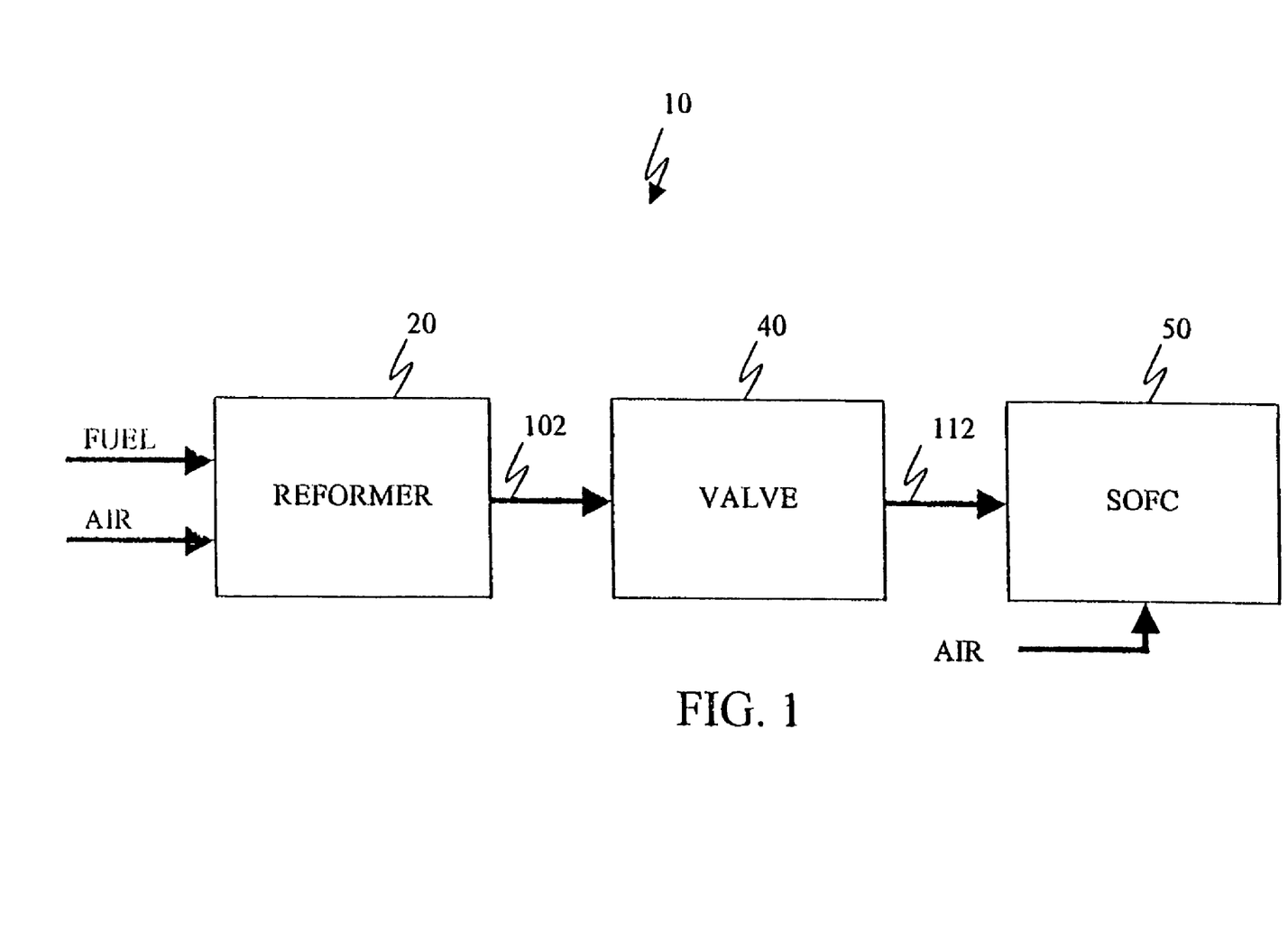
FIG. 1 is a block diagram depicting a typical reformer and SOFC system of an auxiliary power unit.

FIG. 1 depicts a portion of a typical power system 10 employing a SOFC 50 and a reformer 20. Fuel is supplied to the reformer 20, and processed resulting in a reformate 102, which is supplied to the SOFC 50. The reformate 102 is typically metered and controlled via a fixed orifice or valve 40, which restricts the flow of the reformate 102 to the SOFC 50. Generally, power systems 10 may comprise at least one SOFC 50, an engine, and one or more heat exchangers. In addition, a power system 10 may include one or more compressors, an exhaust turbine, a catalytic converter, preheating device, an electrical source (e.g., battery, capacitor, motor/generator, or turbine), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as conventional components. In addition, the SOFC 50 may also be electrically connected with other electrochemical cells or SOFCs.

To facilitate the production of electricity by the SOFC 50, a direct supply of simple fuel, e.g., hydrogen, carbon monoxide, and/or methane is preferred. However, concentrated supplies of these fuels are generally expensive and difficult to store and supply. Therefore, the fuel utilized may be obtained by processing of a more complex fuel. The actual fuel utilized in the system is typically chosen based upon the application, expense, availability, and environmental issues relating to a particular fuel. Possible fuels may include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, dimethyl ether, and others; as well as combinations comprising at least one of the foregoing fuels. The preferred fuel is typically based upon the type of engine employed, with lighter fuels, i.e., those which can be more readily vaporized and/or conventional fuels which are readily available to consumers, generally being preferred.

Furthermore, the fuel for the SOFC 50 may be processed in a reformer 20. A reformer 20 generally converts one type of fuel to another, more compatible with the SOFC 50 (e.g., hydrogen). Mainly, two types of reformer technologies are employed; steam reformers, which employ exothermic reaction, and partial oxidation reformers, which employ an endothermic reaction. Steam reformer technology is generally employed for converting methanol to hydrogen. Partial oxidation reformers are generally employed for converting gasoline to hydrogen. Typical considerations for the reformers include rapid start, dynamic response time, fuel conversion efficiency, size, and weight.

The SOFC 50 may be used in conjunction with an engine, for example, to produce tractive power for a vehicle. Within the engine, SOFC effluent, air, and/or fuel are burned to produce energy, while the remainder of unburned fuel and reformed fuel is used as fuel in the SOFC 50. The engine can be any conventional combustion engine including, but not limited to, internal combustion engines such as spark ignited and compression ignited engines, including, but not limited to, variable compression engines.

Figure 2:
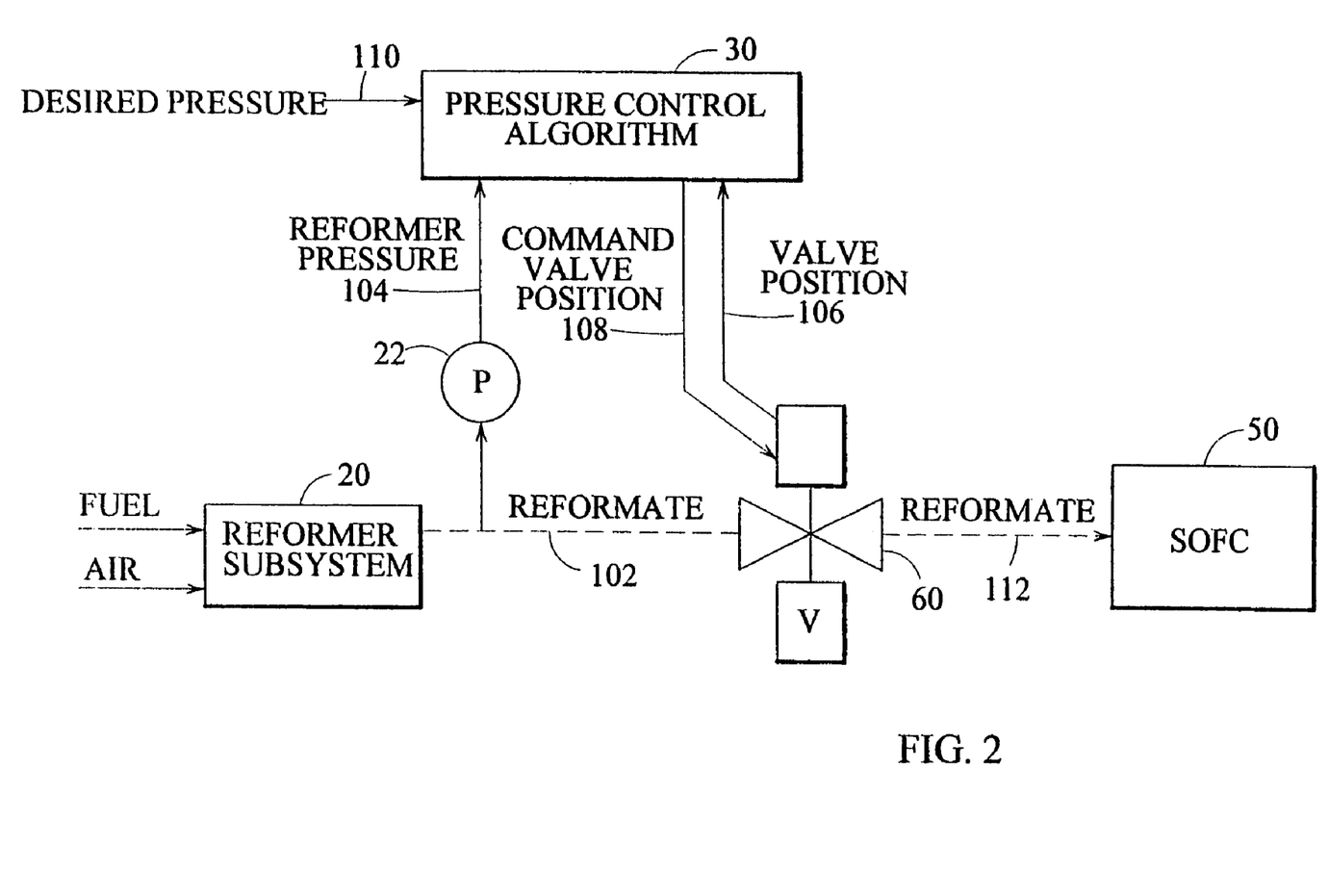
FIG. 2 is a block diagram depicting an embodiment with a reformer and SOFC system employing dynamic pressure controls.

FIG. 2 depicts a block diagram of an embodiment of the invention as interposed in a power system 10. A reformer 20 processes fuel generating a reformate 102. A reformate pressure sensor 22 measures the reformate pressure and generates a reformate pressure signal 104, which is transmitted to a controller 30. The reformate 102 flows to the SOFC 50 via a controllable valve 60. The controllable valve 60 is configured to receive a controllable valve command 108 from the controller 30. The controllable valve 60 also includes a position sensor (not shown), which detects the position of the valve and transmits the measured controllable valve position signal 106 representative of that position to the controller 30.

In order to perform the prescribed functions and desired processing, as well as the computations therefore (e.g., the execution of pressure control algorithm(s), and the like), controller 30 may include, but not be limited to, a processor (s), computer(s), memory, storage, register(s), timing, interrupt(s), communication interfaces, and input/output signal interfaces, as well as combinations comprising at least one of the foregoing. For example, controller 30 may include signal input signal filtering to enable accurate sampling and conversion or acquisitions of such signals from communications interfaces. Additional features of controller 30 and certain processes therein are thoroughly discussed at a later point herein.

Figure 3:
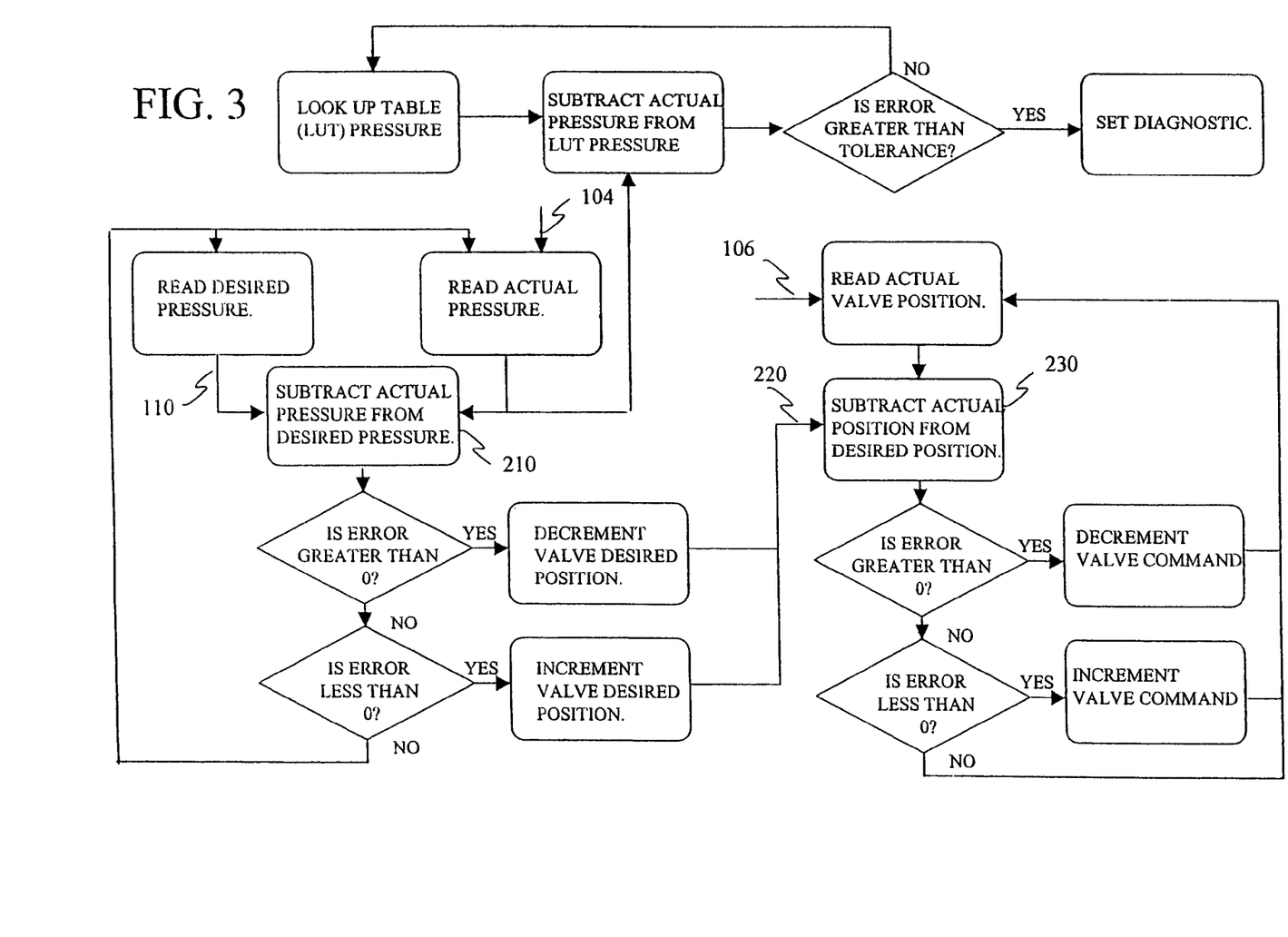
FIG. 3 is a flow diagram depicting a dynamic pressure control algorithm.

As exemplified in a disclosed embodiment as depicted in FIGS. 2 & 3, one such process may be controlling the position of the controllable valve 60 in response to various system parameters. Controller 30 receives various input signals including, but not limited to, those identified above, to facilitate such processing and may provide one or more output signals in response. In an embodiment, the controller 30 receives as input signals: a desired reformate pressure signal 110 representative of the desired reformate pressure, the reformate pressure signal 104, the measured controllable valve position signal 106, and transmits as an output a controllable valve command 108.

Referring now to FIG. 3, an exemplary depiction of a pressure control algorithm is provided. The reformate pressure signal 104 is compared with the desired reformate pressure signal 110 at pressure comparator 210 to formulate a reformate pressure error signal. A desired position for the controllable valve 60 is determined in response to the reformate pressure error signal. In an embodiment, if the reformate pressure error is greater than a first pressure error threshold, a desired controllable valve position value 220 is decreased. Likewise, if the reformate pressure error is less than a second pressure error threshold, the desired controllable valve position value 220 is increased. Thereby, a new desired controllable valve position value 220 is generated. In an exemplary embodiment, the pressure error thresholds for both comparisons are set at zero. However, it will be appreciated that a variety of thresholds may be envisioned based on the desired operational characteristics. For example, providing for operational dead-band or hysteresis to simplify controller functions. Also of note, the increase or decrease in the desired controllable valve position value 220 may include, but not be limited to, such functions as a look-up table, scaling, counters, and/or other implementation methodologies for adjusting the set point for the desired controllable valve position value 220. The new desired controllable valve position value 220 of the controllable valve 60 may be compared to the measured controllable valve position signal 106. The comparison at valve position comparator 230 yields a difference between the desired and measured positions, which is a valve position error. The valve position error is then compared to a first position error threshold and a second position error threshold to ascertain if an adjustment in the controllable valve command 108 is warranted.

For example, if the valve position error is greater than the first position error threshold, the controllable valve command 108 is decreased, thereby reducing the controllable valve position and causing the controllable valve 60 to close a predetermined increment. Likewise, if the valve position error is less than the second position error threshold, the controllable valve command 108 is increased, thereby increasing the controllable valve position and causing the controllable valve to open a predetermined increment. In such a manner, a closed loop control of the pressure to the SOFC 50 is achieved. For example, if the measured pressure 104 of the reformate is too high, the subtraction at pressure comparator 210 generates a reformate pressure error signal, which if it is less than the second pressure error threshold, increases the desired controllable valve position value 220. The increased desired controllable valve position in turn, causes an increase on the controllable valve command 108, thereby resulting in an increase in the controllable valve position, opening the controllable valve 60, causing a decrease in the pressure of the reformate supplied to the SOFC 50.

As stated earlier, relating to the pressure error threshold, it will once again be appreciated that a variety of thresholds may be envisioned. Likewise, once again, the modification of the controllable valve command 108 may include, but not be limited to, such functions as a look-up table, scaling, counters, and/or other implementation methodologies for adjusting the set point for the desired controllable valve position.

In addition to control of controllable valve 60, the measured reformate pressure signal 104 may further be employed in a diagnostic algorithm to facilitate evaluation of proper operation of the reformer 20 and controller 30. For example, the measured reformate pressure signal 104 is compared with a predictive pressure for the operating conditions of the reformer 20. If the comparison should yield an error beyond a predetermined tolerance, corrective measures may be implemented and/or a diagnostic flag may be set to signal the presence of a malfunction.

It is noteworthy to appreciate that, employing the method disclosed herein, as the operational characteristics of system components dynamically change, the pressure control system likewise, modifies its parameters accordingly. Therefore, changes in system performance due to downstream system degradation may be automatically accounted for and compensated. Likewise, other system variances, which may not have been addressed, may set a system diagnostic flag, prompting corrective measures.

Figure 4:
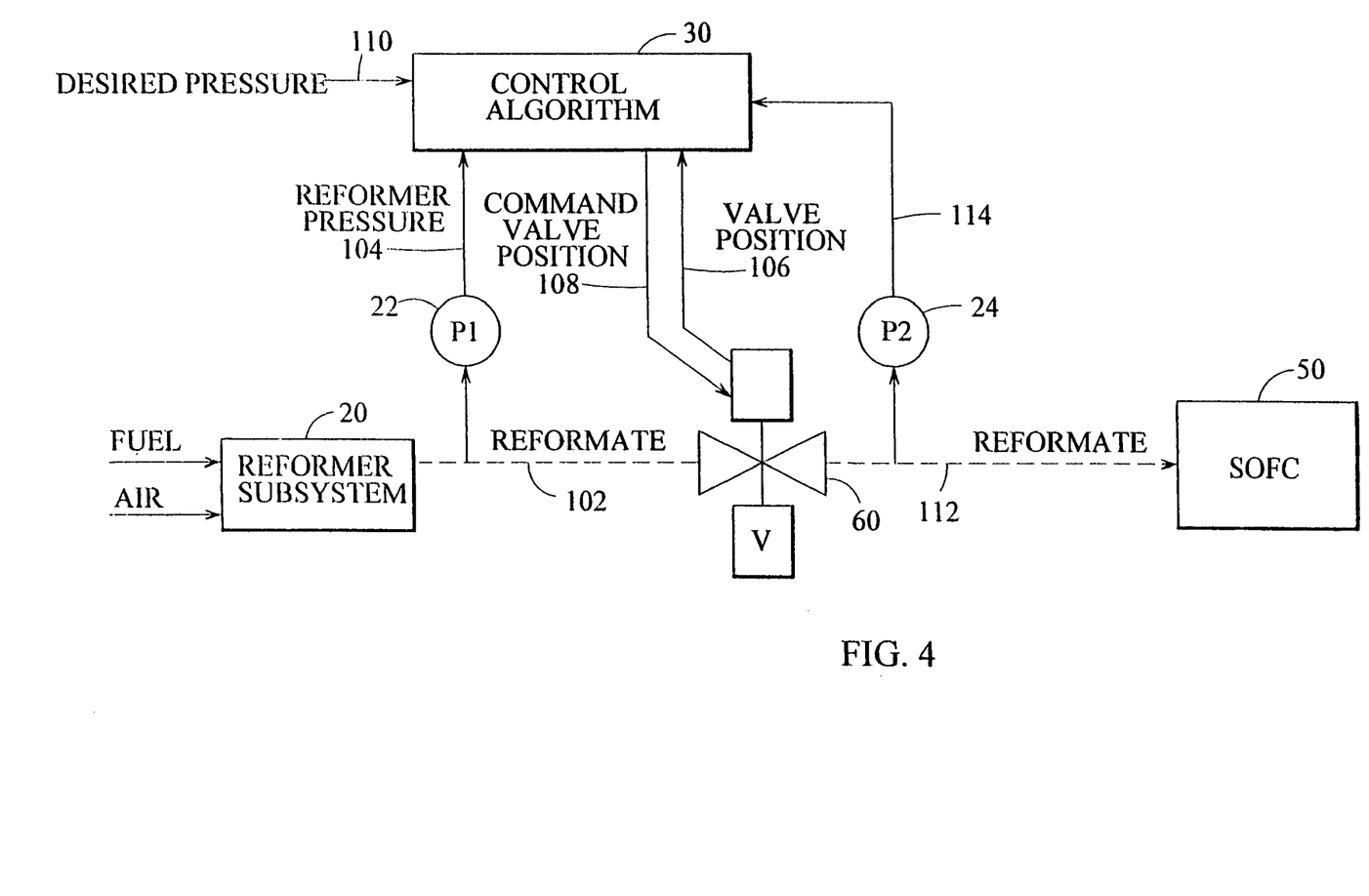
FIG. 4 is a block diagram depicting an alternative embodiment with a reformer and SOFC system employing dynamic flow controls.

FIG. 4 depicts a block diagram of an alternative embodiment on as interposed in a power system 10. In this embodiment, a mass flow control system similar to the abovementioned pressure control system is disclosed. Similar to the pressure control system depicted in FIG. 2, the reformer 20 processes fuel generating a reformate 102. The reformate pressure sensor 22 measures the reformate pressure and generates a reformate pressure signal 104, which is transmitted to controller 30. The controllable valve 60 meters the reformate 102 as it flows to the SOFC 50. The controllable valve 60 is configured to receive the controllable valve command 108 from the controller 30. The controllable valve 60 also includes the position sensor (not shown), which detects the position of the valve and transmits a measured controllable valve position signal 106 representative of that position to the controller 30. An SOFC pressure sensor 24 measures the pressure of the metered reformate 112 and generates a metered reformate pressure signal 114, which is transmitted to controller 30.

Figure 5:
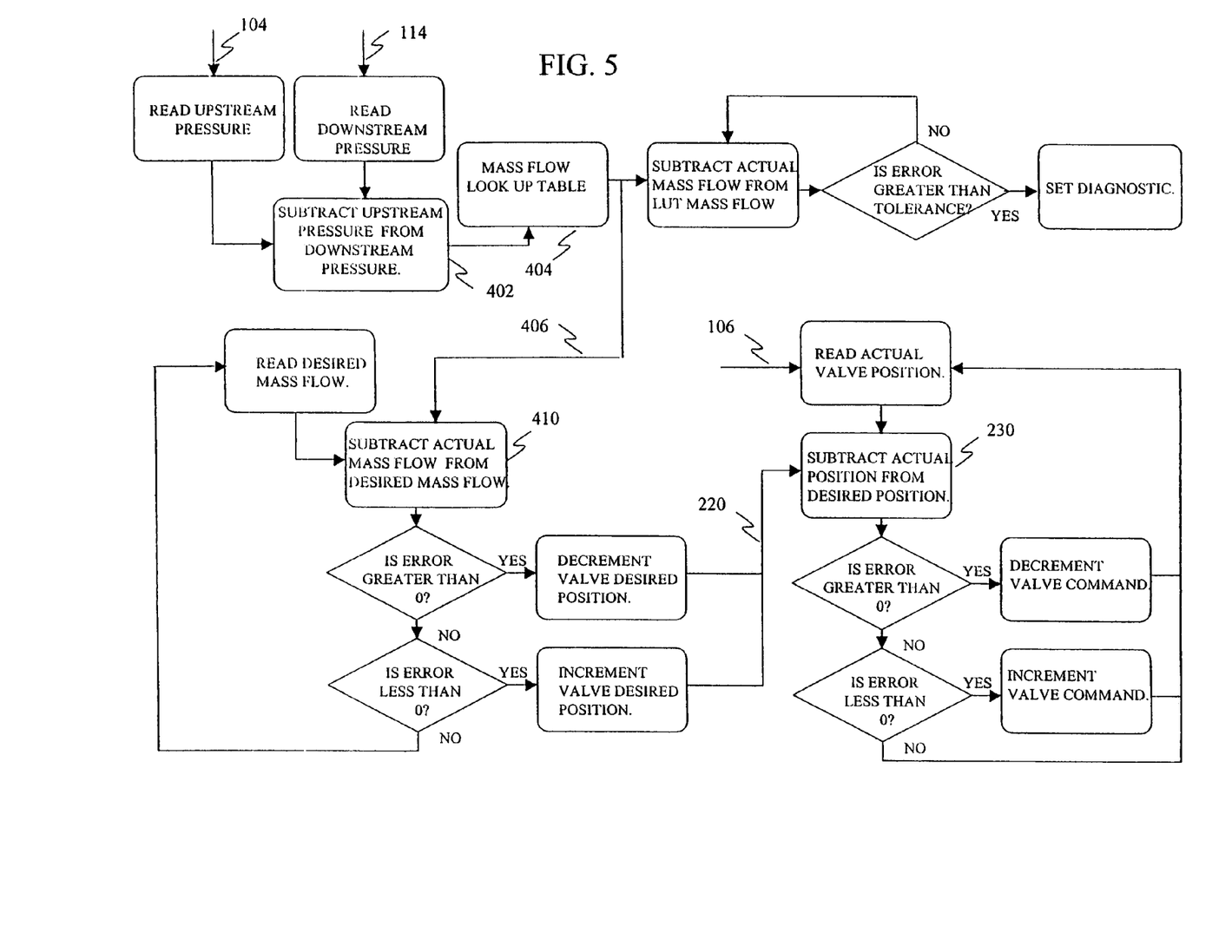
FIG. 5 is a flow diagram depicting a dynamic flow control algorithm.

Turning now to FIG. 5, as well as FIG. 4, a mass flow control algorithm is depicted. The mass flow control algorithm again, is similar to the pressure control algorithm of FIG. 3, with the exception of including processing for the metered reformats pressure signal 114. In this embodiment, the reformate pressure signal 104 is compared with the metered reformats pressure signal 114 at difference 402 to formulate a pressure differential signal. The pressure differential signal is converted to an actual mass flow signal 406 utilizing a look up table 404, which is indexed by the pressure differential signal. The actual mass flow signal 406 evaluated versus a theoretical mass flow signal at mass flow comparator 410 to determine a mass flow error signal. A desired controllable valve position value 220 for the controllable valve 60 is determined, responsive to the mass flow error signal.

It will be appreciated that while the disclosed embodiments refer in several instances, to a configuration utilizing look-up tables in implementation, such a reference is illustrative only and not limiting, various alternatives will be apparent to those skilled in the art. For example, the processes described above could employ, in addition to or in lieu of look-up tables, direct algorithms, gain or parameter scheduling, linearized interpolation or extrapolation, and/or various other methodologies, that may facilitate execution of the desired functions.

In an embodiment, if the mass flow error is greater than a first mass flow error threshold, the desired controllable valve position value 220 is decreased. Likewise, if the mass flow error is less than a second mass flow error threshold, the desired controllable valve position value 220 is increased. Thereby, a new desired controllable valve position value 220 is generated. Similar to the previously disclosed embodiment, the predetermined thresholds for both comparisons are set at zero. Again, it will be appreciated that a variety of thresholds are possible. Also of note, once again, the method of determining the desired controllable valve position 200 may include the same variations as disclosed earlier.

The new desired controllable valve position value 220 of the controllable valve 60 may be compared to the measured controllable valve position signal 106. The comparison at valve position comparator 230 yields a difference between the desired and measured positions, which is a valve position error. The valve position error is then compared to a set of predetermined thresholds to ascertain if an adjustment in the controllable valve command 108 is warranted.

In an embodiment, if the valve position error is greater than a third position error threshold, the controllable valve command 108 is decreased causing the controllable valve 60 to close a predetermined increment. Likewise, if the valve position error is less than a fourth position error threshold, the controllable valve command 108 is increased causing the controllable valve to open a predetermined increment. Thereby, control of the mass flow to the SOFC 50 is achieved. For example, if the actual mass flow signal 406 of the reformate is too high, the subtraction at mass flow comparator 410 generates a mass flow error signal, which if it is less than the fourth position error threshold, increases the desired controllable valve position value 220. The increased desired controllable valve position in turn, causes an decrease on the controllable valve command 108, thereby resulting in a decrease in the position and closing of the controllable valve 60 resulting in a decrease in the mass flow of the reformate supplied to the SOFC 50. Similar to the previous disclosures, it will be appreciated once again, that a similar variety of thresholds may be envisioned. In a manner similar to the previous case, the method of determining the controllable valve command 108 may include may include the same variety of characteristics as disclosed earlier.

Similarly, like the pressure control case, in the alternative embodiment, the actual mass flow signal 406 may further be employed in a diagnostic algorithm to facilitate proper operation of the reformer 20 and controller 30. For example, the actual mass flow signal 406 is compared with a predictive mass flow for the operating conditions of the reformer 20. If the comparison should yield an error in beyond a predetermined tolerance, corrective measures may be implemented and/or a diagnostic flag may be set to signal the malfunction.

It is noteworthy to appreciate that, employing the method disclosed herein, as the operational characteristics of system components dynamically change, the mass flow control system likewise, modifies its parameters accordingly. Therefore, changes in system performance due to downstream system degradation may be automatically accounted for and compensated. Likewise, other system variances, which may not have been addressed, may set a system diagnostic flag, prompting corrective measures.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. Additionally, the method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, such that, when the computer program code is loaded into and executed by a computer, the computer becomes an apparatus capable of executing the method. When implemented on a general-purpose microprocessor, the computer program code segments configure the microprocessor to create specific logic circuits.

Therefore, the foregoing disclosure provides in multiple embodiments, methodologies and systems for controlling the reformate applied to an electrochemical cell. Moreover, the same methodologies could be applied to the control of hot gases delivered to an engine, for example an internal combustion engine. Finally, diagnostic methodologies are disclosed that allow for evaluation of operational characteristics and provide a means for detecting malfunctions and leaks in the system.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

The invention claimed is:

1. A method for controlling reformate delivered to an electrochemical cell in an electric power system, comprising:
  receiving a reformate pressure signal from a reformate pressure sensor;
  receiving a controllable valve position signal from a controllable valve disposed in said reformate;
  actuating said controllable valve in response to said reformate pressure signal, a desired reformate pressure, and said controllable valve position signal.

2. The method of claim 1 wherein said actuating is responsive to a reformate pressure error signal responsive to the difference between said reformate pressure signal and said desired reformate pressure signal.

3. The method of claim 2 wherein said actuating is in response to a desired controllable valve position value.

4. The method of claim 3 wherein said desired controllable valve position value is responsive to said reformate pressure error signal.

5. The method of claim 4 wherein said desired controllable valve position value is reduced if said reformate pressure error signal is greater than a first pressure error threshold and increased if said reformate pressure error signal is less than a second pressure error threshold.

6. The method of claim 1 wherein:
  said actuating is responsive to a controllable valve position error; and
  said controllable valve position error is responsive to the difference between a controllable valve position signal and a desired controllable valve position value.

7. The method of claim 3 wherein said actuating is responsive to a controllable valve command.

8. The method of claim 7 wherein said controllable valve command is responsive to a controllable valve position error.

9. The method of claim 8 wherein said controllable valve command is reduced if said controllable valve position error signal is greater than a first position error threshold and increased if said controllable valve position error signal is less than a second position error threshold.

10. The method of claim 1 wherein said actuating is responsive to a controllable valve command.

11. The method of claim 10 wherein said controllable valve command is responsive to a controllable valve position error.

12. The method of claim 11 wherein said controllable valve command is reduced if said controllable valve position error signal is greater than a first position error threshold and increased if said controllable valve position error signal is less than a second position error threshold.

13. The method of claim 11 wherein said controllable valve position error is responsive to the difference between a controllable valve position signal and a desired controllable valve position value.

14. The method of claim 13 wherein said desired controllable valve position value is responsive to a reformate pressure error signal.

15. The method of claim 14 wherein said reformate pressure error signal is responsive to a difference between said reformate pressure signal and said desired reformate pressure signal.

16. The method of claim 14 wherein said desired controllable valve position value is reduced if said reformate pressure error signal is greater than a first pressure error threshold and increased if said reformate pressure error signal is less than a second.

17. The method of claim 1 further including:
  receiving a metered reformate pressure signal representative of the metered reformate pressure;
  actuating said controllable valve in response to said reformate pressure signal, said metered reformate pressure signal, said desired reformate pressure signal, and said controllable valve position signal.

18. The method of claim 17 wherein said actuating is responsive to an actual mass flow of said reformate, wherein an actual mass flow signal is computed from a pressure differential signal.

19. The method of claim 18 wherein said pressure differential signal is responsive to a difference between said reformate pressure signal and said metered reformate pressure signal.

20. The method of claim 18 wherein said pressure differential signal is utilized to index a look up table to yield said actual mass flow signal.

21. The method of claim 20 wherein said actuating is responsive to a mass flow error signal responsive to the difference between a theoretical mass flow signal and said actual mass flow signal.

22. The method of claim 21 wherein said actuating is responsive to a desired controllable valve position value which is reduced if said mass flow error signal is greater than a first mass flow error threshold and increased if said reformate pressure error signal is less than a second mass flow error threshold.

23. A system for controlling reformate delivered to an electrochemical cell in an electric power system comprising:
   a reformate pressure sensor disposed in said reformate and configured to measure reformate pressure at a reformer;
   a controllable valve disposed in said reformate and configured to control the flow of reformate to said electrochemical cell responsive to a controllable valve command; and
   a controller coupled to said reformate pressure sensor and said controllable valve, and
   wherein said controller receives a reformate pressure signal from said reformate pressure sensor, a controllable valve position signal from said controllable valve, and transmits said controllable valve command responsive to at least one of said reformate pressure signal, a desired reformate pressure signal, and said controllable valve position signal.

24. The system of claim 23 wherein said controllable valve command is responsive to a reformate pressure error signal responsive to the difference between said reformate pressure signal and a desired reformate pressure signal representative of a desired reformate pressure.

25. The system of claim 23 herein said controllable valve command is responsive to a desired controllable valve position value.

26. The system of claim 25 wherein said desired controllable valve position value is responsive to a reformate pressure error signal.

27. The system of claim 26 wherein said desired controllable valve position value is reduced if said reformate pressure error signal is greater than a first pressure error threshold and increased if said reformate pressure error signal is less than a second pressure error threshold.

28. The system of claim 23 wherein
   said controllable valve command is responsive to a controllable valve position error; and
   said controllable valve position error is responsive to a difference between a measured controllable valve position signal and a desired controllable valve position value.

29. The system of claim 23 wherein said controllable valve command is responsive to a controllable valve position error.

30. The system of claim 29 wherein said controllable valve command is reduced if said controllable valve position error signal is greater than a first position error threshold and increased if said controllable valve position error signal is less than a second position error threshold.

31. The system of claim 29 wherein said controllable valve position error is responsive to the difference between a controllable valve position signal and a desired controllable valve position value.

32. The system of claim 31 wherein said desired controllable valve position value is responsive to a reformate pressure error signal.

33. The system of claim 32 wherein said reformate pressure error signal is responsive to a difference between said reformate pressure signal and said desired reformate pressure signal.

34. The system of claim 33 wherein said desired controllable valve position value is reduced if said reformate pressure error signal is greater than a first pressure error threshold and increased if said reformate pressure error signal is less than a second pressure error threshold.

35. The system of claim 23 further including:
   a metered reformate pressure sensor coupled to said controller and configured to measure reformate pressure at said electrochemical cell;
   wherein said controller further receives a metered reformate pressure signal generated by said metered reformate pressure sensor and said controllable valve command is also responsive to said metered reformate pressure signal.

36. The system of claim 35 wherein said controllable valve command is responsive to an actual mass flow of said reformate, wherein an actual mass flow signal is computed from a pressure differential signal.

37. The system of claim 36 wherein said pressure differential signal is responsive to a difference between said reformate pressure signal and said metered reformate pressure signal.

38. The system of claim 36 wherein said pressure differential signal is utilized to index a look up table to yield said actual mass flow signal.

39. The system of claim 35 wherein said actuating is responsive to a mass flow error signal responsive to the difference between a theoretical mass flow signal and said actual mass flow signal.

40. The system of claim 39 wherein said actuating is responsive to a desired controllable valve position value which is reduced if said mass flow error signal is greater than a first mass flow error threshold and increased if said reformate pressure error signal is less than a second mass flow error threshold.

* * * * *